May 27, 1930.  C. V. NEWBILL  1,759,994
BOLT LOCK
Filed Dec. 31, 1924
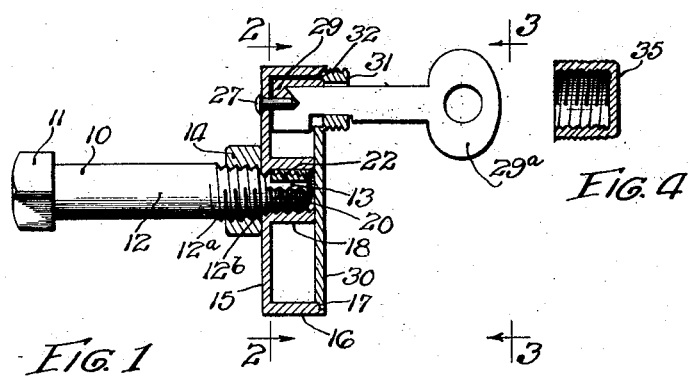
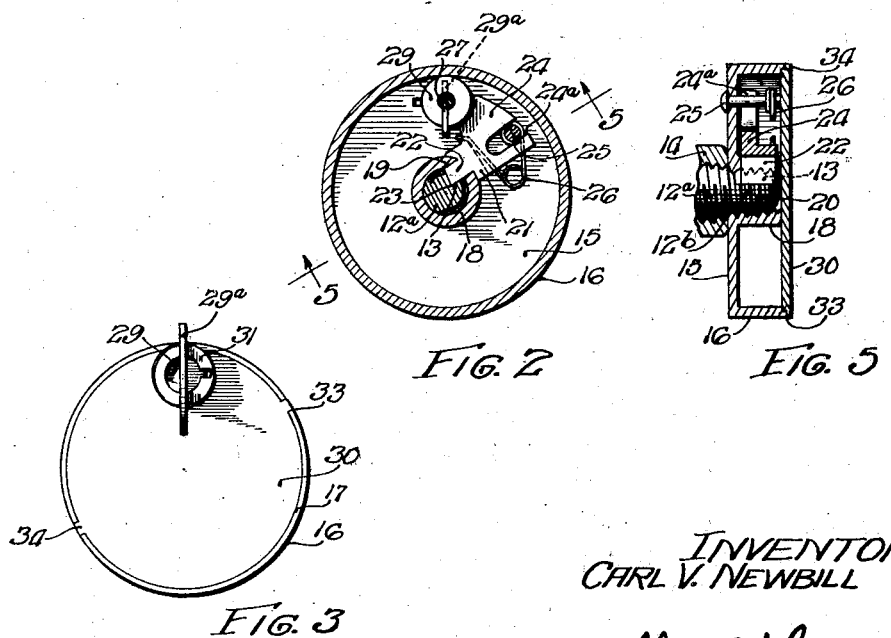
INVENTOR
CARL V. NEWBILL
ATTY.

Patented May 27, 1930

1,759,994

UNITED STATES PATENT OFFICE

CARL V. NEWBILL, OF THE DALLES, OREGON

BOLT LOCK

Application filed December 31, 1924. Serial No. 759,014.

The present invention relates to a key operated locking device, and has a peculiarly unique application in that it is adapted to be placed upon a threaded stem, after a nut is affixed thereto, to prevent tampering with said nut.

Among the objects of the invention are the following:

The provision of a key-operated locking member for use upon a threaded member;

The arrangement of the mechanism in such a member so that the key must be used therewith or said member will automatically relock at each complete rotation about the bolt to which affixed;

The adaptation of such a member to ready application upon a bolt, it being made unnecessary to employ the key in attaching the lock to such bolt;

The employment of novel locking means for securing an article upon a bolt; and

The provision of a new and unique locking member for securing a spare tire or the like to a carrier therefor, such locking member being equally suitable for engaging a tire in use upon the rim to which affixed.

These, and such other objects as may hereinafter appear, are attained by the novel construction, combination and arrangement of the several elements which constitute the device herein illustrated as one embodiment of the invention.

In the single sheet of drawing attached hereto and hereby made a part of this specification:—

Figure 1 is a diametric section through the lock member.

Figure 2 is an axial section thereof, taken on the line 2—2 of Figure 1.

Figure 3 is a front view of the complete lock, taken on the line 3—3 of Figure 1.

Figure 4 is a longitudinal section through the dust cap therefor.

Figure 5 is a diametric section on the line 5—5 of Figure 2, looking in the direction of the arrows.

Like reference characters are used to designate similar parts in the drawing and in the description which follows.

In Figure 1, a bolt 10 is shown. Said bolt comprises a head 11 and a shank 12 having two threaded portions of different diameters, the larger of said threaded portions $12^a$ being nearer head 11 the smaller portion thereof $12^b$ contiguous therewith. The section $12^b$ adjacent its end is longitudinally grooved, said groove being designated 13 and is visible in Figures 1, 2 and 5. The groove 13 is usually formed in a V-shape although other shapes may be employed.

Disclosed upon the threaded section $12^a$ is a nut 14. A nut is not necessary, however, for the use of the device. In order to secure the locking device, now to be described, to said bolt 10, it is necessary when nut 14 is used, to thread said nut sufficiently high upon said bolt 10 to expose a number of the threads upon section $12^b$.

The lock forming the subject matter of this application for patent comprises, primarily, a case 15 having a marginal flanged wall 16 in which is a grooved circular seat 17. In the center of case 15 is a hub 18 which must be of a depth exceeding the length of section $12^b$. Said hub 18 is open at one side or section to provide a radial passage 19, and is threaded upon its internally exposed wall 20. The threading upon wall 20 is such that the lock member may be threaded onto section $12^b$ of bolt 10.

Slidably mounted in case 15 intermediate hub 18 and flanged wall 16 is a locking ratchet 21. Said ratchet 21 comprises a lug 22 having a V-shaped tip 23 adapted to project into and lockingly engage in groove 13. Said lug 22 is adapted to pass into radial opening 19 and to be reciprocated therein. The body of ratchet 21 engages hub 18 to limit the inward movement of lug 22 when the lock is disengaged from bolt 10.

Upon one side of ratchet 21 and depending therefrom in the direction of marginal wall 16 is a plate 24. In said plate 24 is a slot $24^a$ opening in the direction of said wall 16. Said plate 24 upon each parallel margin of slot $24^a$ engages a lug 25 in case 15, which lug 25, in conjunction with radial opening 19 in hub 18, maintains ratchet 21 in operable position and forms a guide therefor.

Secured about one end upon lug 25 is a spring 26 engaging at its other end the ratchet 21 at its main section to urge said ratchet 21 toward the center of the device.

A second lug 27 is disposed adjacent plate 24. Said lug 27 is pointed, as disclosed, and thereupon a tumbler or barrel 29 rotates, said tumbler or barrel 29 having a section of smaller diameter at its inner end to allow a proper key 29$^a$ inserted therein to be exposed to engage plate 24 to force said ratchet 21 away from the bolt 10 and to lift ratchet end 23 from groove 13 in said bolt, so that the whole lock may be rotated upon threads 12$^b$ to disengage it from bolt 10. The pointed end of lug 27 is adapted to project into the V-shaped end of key 29$^a$ as well as to provide a support for the tumbler or barrel 29 in which the key slot extends through one side.

The tumbler 29, spring 26 and ratchet 21 are held in position in case 15 by a cover therefor, designated 30, which cover 30 is adapted to be seated in grooved seat 17. In said cover 30 is a hub 31 having an internal circular seat 32 to receive rotatable tumbler 29 and to secure same for rotation upon lug 27.

In the margin of case 15, two or more radial seats 33 may be formed to receive extension 34 upon cover 30 whereby said cover may be expediently and accurately assembled upon said case 15. The case 15 and cover 30 may be suitably joined in any customary manner well known in the arts as by stamping, rivets, or other means.

Hub 31 may be externally threaded to receive a dust cap 35 shown in Figure 4. Such cap 35 prevents the lock from filling with dust or water either of which might hamper its effectiveness and operativeness.

From the description hereinabove given, the operation of the lock should be clear. When a spare tire or other item is secured in position upon a bolt of the character disclosed having a portion of its threaded and grooved shank exposed, or projecting beyond a nut thereon, the lock is rotated into position upon said bolt by turning it inwardly upon the bolt threads. The sloping face of lug 22 offers no resistance to rotation into a locking position in view of the square shouldered screw end upon bolt section 12$^b$. To release, the key 29$^a$ is inserted into tumbler 29 and turned therein whereby ratchet 21 is forced out of engagement with the bolt 10, and the locking member is then rotated until released from the threads upon said bolt. The key 29$^a$ must be maintained in its unlocking position during the rotation of the locking member, or it must be moved into unlocking position upon each complete rotation of said locking member.

I claim:—

1. In a device of the character described, a bolt having two contiguous threaded sections of different diameters, the outermost having a longitudinal slot therein, a nut on the innermost of said threaded sections, a lock housing in threaded engagement with the outermost threaded section of said bolt, a slot engaging member radially slidable with and wholly at one side of said housing, a spring upon the same side of said housing for normally urging said engaging member into the slot in said outermost threaded section, and key operated means also within said housing for moving said member from said slot, said engaging member and slot having correspondingly shaped inclined cooperating faces effective to permit the member to disengage said slot as the housing is turned to threadedly engage said bolt.

2. In a device of the character described, a threaded bolt, there being a slot interrupting an appreciable number of threads on said bolt, a lock housing having an axial lug therethrough and in threaded engagement with the slotted section of said bolt, a reciprocally mounted radial pawl in said housing engageable with said slot to permit uni-directional rotation of said housing on said bolt, key operated means for camming said pawl to disengage said slot, thereby permitting the removal of said housing from said bolt, said pawl having a slot to receive said lug, and a spring anchored to said lug and engaging said pawl to urge it into operable position.

CARL V. NEWBILL.